United States Patent [19]

Berger et al.

[11] 4,164,482
[45] Aug. 14, 1979

[54] ABSORBENT FOR WATER PURIFICATION AND PROCESS FOR PREPARING SAME

[75] Inventors: Harald Berger; Karl-Ernst Quentin, both of Kelkheim; Ludwig Weil, Munich, all of Fed. Rep. of Germany

[73] Assignee: Hoechst Aktiengesellschaft, Frankfurt am Main, Fed. Rep. of Germany

[21] Appl. No.: 806,273

[22] Filed: Jun. 13, 1977

[30] Foreign Application Priority Data

Jun. 15, 1976 [DE] Fed. Rep. of Germany ....... 2626732

[51] Int. Cl.$^2$ ..................... B01J 21/18; B01J 29/06; B01J 31/02
[52] U.S. Cl. ............................. 252/428; 252/455 Z; 252/463; 252/430

[58] Field of Search .................. 252/428, 444, 455 Z, 252/463

[56] References Cited

U.S. PATENT DOCUMENTS

| | | | |
|---|---|---|---|
| 3,091,550 | 5/1963 | Doying | 252/444 X |
| 3,813,347 | 5/1974 | Hayes | 252/444 X |
| 3,951,859 | 4/1976 | Inaba et al. | 252/428 X |

*Primary Examiner*—Carl Dees
*Attorney, Agent, or Firm*—Curtis, Morris & Safford

[57] ABSTRACT

An absorbent for water purification consisting of organic polymers and inorganic absorbing matter having a large surface is obtained by epitactically linking with each other the two components. The absorbent has good absorbing properties with respect to different classes of substances.

8 Claims, No Drawings

ABSORBENT FOR WATER PURIFICATION AND PROCESS FOR PREPARING SAME

This invention relates to an absorbent for water purification and to a process for preparing the same.

It is known to purify raw waters by physical and chemical processes. The classic procedure is the disinfection of the raw water by chlorination or ozonization, the flocculation with aluminum or iron hydroxide with subsequent filtration through a gravel bed.

In the voluminous flock of aluminum or iron hydroxide finely divided suspended matter is taken up and water-soluble, substantially hydrophilic constituents are absorbed and removed together with the contact sludge.

In many cases, however, the elimination of pollutant constituents as contained in highly contaminated water is very difficult or incomplete. Therefore, processes are used or have been proposed comprising additional purification steps. In these processes, absorption agents such as aluminum oxide, active carbon or finely divided polyethylene are used.

The aforesaid products can be added in the flocculation or used in another part of the purification plant, for example as filter material in absorption towers.

Owing to the fact that each of the aforesaid products has a specific absorption behavior with respect to different classes of substances—for example lipophilic substances such as chlorohydrocarbons, hydrocarbons and polycyclic compounds are very efficiently absorbed by polyethylene while polar contaminants, for example phenol and its derivatives and detergents, are more satisfactorily absorbed by active carbon—it has been quite obvious to use mixtures of different absorbents. But such a mode of operation involves disadvantages. When, for example, polyethylene and active carbon are used in the form of a common aqueous suspension in a 50:50 mixture, the individual components of the mixture readily separate in the flocculation vessel. The relatively heavy active carbon sinks down into the sludge while the polyethylene settles very slowly together with the iron hydroxide.

Mixtures of polyethylene and active carbon are not very suitable either for use as filter layers as separation readily occurs in the deposit of a pre-mixed slurry of the two components. Also the components deposit gradually when added to the water to be purified. When mixtures of the two components are used in absorption columns or filters operated with reverse water flow, demixing also occurs very readily.

It has now been found that a very suitable form of a combination absorbent can be obtained by precipitating an ethylene polymer from a dispersion which is substantially free from emulsifier or contains as little emulsifier as possible in the presence of a further absorbent.

It is, therefore, an object of the present invention to provide an absorbent for the purification of water consisting of a mixture of organic polymers and inorganic absorbing matter having a large surface wherein the two components are epitactically linked with each other. It is another object of the present invention to provide a process for preparing such an absorbent.

To prepare the absorbent of the invention the inorganic absorbing matter is stirred into an aqueous dispersion of the organic polymer, whereby the polymer coagulates on the adsorptive surface of the inorganic component so that it is firmly linked with the latter by adsorption or grows on the surface of the latter in such a manner that separation of the two components is avoided in industrial use. It is surprising that by this procedure the absorptive properties of the two components are not impaired.

In the process of the invention all organic polymers which can be prepared in the form of aqueous dispersions are suitable.

Especially suitable polymeric substances are polymers of ethylene and the oxidation products thereof, or of substituted ethylenes as well as copolymers of the aforesaid compounds, above all those consisting of more than 50% by weight, preferably more than 90% by weight of ethylene and less than 50% by weight and preferably less than 10% by weight of other ethylenically unsaturated monomers. Monomers of this type are olefins such as propylene, isobutylene, butadiene; vinyl chloride; vinyl esters such as vinyl propionate, vinyl butyrate and preferably vinyl acetate; vinylcarboxylic acids such as acrylic acid, dimethylacrylic acid, methacrylic acid, crotonic acid, phenylacrylic acid, itaconic acid; vinyldicarboxylic acids such as maleic acid and the anhydrides and imides thereof; vinylcarboxylic acid esters such as methyl, ethyl, propyl, butyl, octyl, decyl, dodecyl and stearyl acrylate, methacrylate and crotonate; or vinylcarboxylic acid amides such as acrylamide, N-methyl-acrylamide, N-ethyl-acrylamide, N-propyl-acrylamide, N-isopropyl-acrylamide, N-butyl-acrylamide and methacrylamide as well as the correspondingly substituted methacrylamides; and ethylenes with aromatic substituents such as styrene.

Especially good results are obtained with dispersions, free from foreign emulsifier, of the aforesaid copolymers containing 99.5% to 85% by weight of structural ethylene units and 0.5 to 15% by weight, preferably 3 to 6% by weight, of structural units of a bis-alkali metal vinylacylamide N-sulfonate and optionally further structural units of ethylenically unsaturated and copolymerizable monomers. Products of this type are described in German Offenlegungsschrift No. 1,720,667.

Prior to coagulation, known inorganic absorbing agents such as active carbon, aluminum oxide, silica gel, zeolites, bleaching earths, bentonite, fuller's earth, activated bauxite, or activated kieselguhr and preferably, however, active carbon, are added to the polymer dispersions. The inorganic absorbing matter is preferably added in powder form, particles sizes below 0.5 mm being especially suitable.

The proportion of polymer substance to inorganic absorbing matter in the coagulated product can vary within wide limits. For water purification, especially for the purification to obtain water of drinking quality, proportions in the range of from 20:80 to 90:10 of polymer to co-absorbent and particularly from 60:40 to 40:60 have proved especially advantageous.

The combination of absorbents consisting of a polymer substance and inorganic absorbing matter of the type described above can be prepared as follows:

The aqueous polymer dispersion, prepared in known manner by direct dispersion polymerization in water or by subsequent dispersion of the polymer in water and having a solids content of 10 to 70% by weight, preferably 30 to 50% by weight, is diluted with water to an extent such that the concentration of solid matter is in the range of from about 10 to 15% by weight. Dispersions of lower concentration need not be diluted. The inorganic absorbing matter is added to the dispersion while stirring either in powder form or in the form of an aqueous paste just capable of flowing. The order of succession in which the components are mixed with each other is not decisive, preferably the component used in a smaller amount is added to the component of which a greater amount is used.

After combination of the two components, the solid is coagulated by known measures, for example temperature increase, change of pH, use of high shearing forces, or addition of a coagulating agent, for example an electrolyte. The coagulated matter is then separated by filtration or centrifugation and freed from water-soluble constituents such as emulsifiers or coagulants by washing with water.

According to a preferred embodiment of the invention the combination of absorbents is prepared by coagulation of a polyethylene dispersion, prepared without emulsifier by copolymerization of ethylene with bis-alkali metal vinylacylamide N-sulfonates in which the vinylacylamide group possibly substituted in the vinyl radical contains from 3 to 6 and preferably 3 or 4 carbon atoms, in the presence of active carbon. Bis-potassium-methacrylamide N-sulfonate constitutes an especially suitable comonomer. After dilution of the dispersion and addition of the active carbon as described in the preceding paragraph, the aqueous mixture is heated to about 75° C. and a strong mineral acid, preferably sulfuric acid, is added in an amount such that a pH of the reaction mixture of 1 to 2 is adjusted. By this measure the free amide-N-sulfonic acid group which readily decomposes at elevated temperature is formed and the comonomer incorporated in the polymer chain and acting as emulsifier is decomposed. A carbon amide group remains in the polymer chain and the sulfonic acid is split off in the form of an alkali metal bisulfate or alkali metal sulfate. As a result, the dispersion becomes unstable, the polymer coagulates on the active carbon and can subsequently be separated with the latter.

The absorbent composition can be separated by usual processes, for example filtration or centrifugation.

Simultaneously, excess sulfuric acid and the formed alkali metal sulfate or bisulfate are removed by intense washing with water until the pH of the wash water at the outlet is equal to that of the wash water at the inlet.

For use as absorption agent in water purification it proves especially advantageous to use a product containing 10 to 60%, preferably 20 to 40% of water. This product is not fluid per se, but can be diluted without difficulty in the usual slowly operating stirring devices to obtain an aqueous suspension which can be pumped by piston pumps and metered, for example, into the flocculation plant of the water purification system. The suspension preferably has a solids content of 1 to 20%, more preferably 5 to 10% of solid matter.

Alternatively, the combination of absorbents according to the invention can be used in dry form, especially as filling matter for fixed bed absorption. In this case, the use of a coarse grained material having a particle size of from 1 to 5 mm is preferred. Granules of this size can be prepared by usual granulation processes, for example from extruded rods, from the combination initially obtained in finely divided form.

It has also been found that the absorbent of the invention has a chlorine consumption which is considerably lower than that corresponding to the proportion of active carbon alone. It is especially surprising that the lower chlorohydrocarbons, for example chloroform and carbon tetrachloride, desorbed from the active carbon and resulting from the chlorine consumption do not migrate into the water to be purified.

The following examples illustrate the invention.

EXAMPLE 1:

100 Kg of a polyethylene dispersion having a solids content of 30% by weight, which had been prepared under a pressure of 400 to 450 bars and at a temperature of 140° C. by copolymerizing ethylene with bis-potassium-methacrylamidosulfonate in water using potassium peroxy-disulfate as free radical initiator and containing a proportion of 3.8% by weight of bis-potassium methacrylamidosulfonate incorporated by copolymerization, were pumped into a vessel with stirrer containing 200 liters of water of 75° C.

30 Kg of pulverized active carbon having a particle size of less than 0.5 mm were added continuously to the dilute dispersion in portions of 1 kg while stirring.

In this manner a suspension of active carbon in the dilute polyethylene dispersion was obtained. The content of the vessel was heated again to 75° C. and 300 ml concentrated sulfuric acid were added.

The viscosity of the suspension increased and shortly thereafter coagulation of the polymer started. After having stirred for about another hour, coagulation was terminated. The solid was separated in a centrifuge and washed in the centrifuge until it was free from acid. 60 Kg of a polyethylene-active carbon composition were obtained, calculated as solid matter, which was centrifuged to a residual water content of about 20%. The product obtained was used in this form for further experiments.

Experiment A:

5 g, calculated as solid matter, of the product prepared as described in Example 1 were introduced while stirring into 1 liter of water and the mixture was stirred for 1 hour at 500 revolutions per minute. The stirrer was then switched off. After 20 minutes, the total product had substantially settled on the bottom of the vessel.

Experiment B: (comparison)

2.5 g of pulverulent active carbon and 2.5 g of polyethylene, obtained from the dispersion prepared as described in Example 1 in the absence of active carbon, were introduced while stirring into 1 liter of water and the mixture was stirred for 1 hour at 500 revolutions per minute, whereupon the stirrer was switched off. After 20 minutes the major proportion of the polyethylene floated on the surface together with a little entrained active carbon, while the main quantity of the active carbon, mixed with a little entrained polyethylene, had settled on the bottom of the vessel.

EXAMPLE 2:

10 μg of γ-1,2,3,4,5,6-hexachlorocyclohexane (Lindan ®) in the form of an acetonic solution were added to 1 liter of tap water from Munich while rapidly stirring and to the mixture there were added a suspension, diluted with water in a proportion of 1:10, of the composition prepared as described in Example 1 in an amount equivalent to 10 mg of dry substance, 50 mg of aluminum sulfate in the form of a 5% aqueous solution and 2 mg of a commercial flocculation agent on the basis of polyacryl amide. Stirring was continued for 5 minutes at reduced stirrer speed. After having been allowed to stand for 60 minutes, the mixture was filtered through a folded filter and in the clear filtrate the content of hexachlorocyclohexane was analyzed.

The separation of the following substances was examined in analogous manner:

EXAMPLE 3:

1,4,5,6,7,8,8-Heptachloro-2,3-epoxi-3a,4,7,7a-tetrahydro-4,7-methano-indene (Hepo ®)

EXAMPLE 4:

1,2,3,4,10,10-Hexachloro-6,7-ethoxy-1,4,4a,5,6,7,8-,8a-octahydro-1,4-endo-5,8-exo-dimethano-naphthalene (Dieldrin ®)

EXAMPLE 5:

1,1,1-Trichloro-2,2-bis(4-chlorophenyl)-ethane (DDT ®)

EXAMPLE 6:

Diethyl-4-nitrophenyl-thiophosphate (Parathion ®)

EXAMPLE 7:

Phenol

EXAMPLE 8:

n-Decane

The results of Examples 2 to 8 are summarized in the following table.

To identify the test substances in the individual examples the following methods were used:

EXAMPLES 2 to 5:

The method described by L. Weil, K.—E. Quentin in "Bestimmung von insektiziden chlorierten Kohlenwasserstoffen" Wasser und Abwasserforschung, volume 7, pages 147–152 (1974).

EXAMPLE 6:

The method described by H. P. Burchfield, D. E. Johnson in "Guide to the analysis of the pesticide residues" 2nd edition, Public Health Service, Office of Pesticides, Washington, D.C. 20201.

EXAMPLE 7:

The method described by D. Weil in "Phenole im Wasser und ihre Bestimmung" Hydrochemische und hydrogeologische Mitteilungen, Institut für Wasserchemie und chemische Balneologie of the Technical University Munich, volume 1, pages 83–96 (1974).

EXAMPLE 8:

The method described in "Deutsche Einheitsverfahren zur Wasseruntersuchung" Verlag Chemie, Weinheim (Bergstrasse) Fed. Rep. of Germany (1960).

Table

Results of Examples 2 to 8 with the use of 10 mg, per liter of tested water, of the polyethylene-active carbon composition 1:1, calculated as dry substance

| Example | 2 | 3 | 4 | 5 | 6 | 7 | 8 |
|---|---|---|---|---|---|---|---|
| Test substance | ®lindan | ®Hepo | ®Dieldrin | ®DDT | ®Parathion | phenol | decane |
| Amount used per liter of water | 10 µg | 10 µg | 10 µg | 10 µg | 50 µg | 1 mg | 55 mg |
| % removal | 66 | 78 | 84 | 100[1] | 73 | 25 | 100[2] |

[1] residual concentration in filtrate below 0.001 µg/l
[2] residual concentration in filtrate below 30 µg/l

What is claimed is:

1. Absorbent for water purification consisting essentially of organic polymer and inorganic absorbing matter, wherein the two components are linked with each other epitactically.

2. Absorbent as claimed in claim 1, wherein the organic polymer is a homo- or copolymer of ethylenically unsaturated monomers.

3. Absorbent as claimed in claim 1, wherein the inorganic absorbing matter is aluminum oxide, silica gel, a zeolite, active carbon, bleaching earth, bentonite, fuller's earth, activated bauxite, or activated kieselguhr.

4. Absorbent as claimed in claim 2, wherein the organic polymer is an ethylene copolymer prepared from more than 50% by weight of ethylene, the balance being other ethylenically unsaturated comonomers.

5. Absorbent as claimed in claim 2, wherein the organic polymer contains from 99.5 to 85% by weight of ethylene structural units and from 0.5 to 15% by weight of structural units of bis-alkali metal methacrylamide N-sulfonate.

6. Absorbent as claimed in claim 5, wherein the inorganic absorbing matter is active carbon.

7. Process for preparing an absorbent for water purification which comprises stirring inorganic absorbing matter into an aqueous dispersion of an organic polymer and bringing about coagulation of the polymer while further stirring.

8. Process as claimed in claim 7, which comprises stirring active carbon into an aqueous dispersion, free from emulsifier, of a copolymer consisting of 99.5 to 85% by weight of ethylene structural units and 0.5 to 15% by weight of structural units of bis-alkali metal methacrylamide N-sulfonate und bringing about coagulation by adding a mineral acid to adjust a pH of the dispersion of 1 to 2.

* * * * *